United States Patent

[11] 3,623,696

| [72] | Inventor | Hans D. Baumann<br>Foxborough, Mass. |
|---|---|---|
| [21] | Appl. No. | 889,030 |
| [22] | Filed | Dec. 30, 1969 |
| [45] | Patented | Nov. 30, 1971 |
| [73] | Assignee | Masoneilan International, Inc.<br>Norwood, Calif.<br>Continuation-in-part of application Ser. No.<br>703,318, Feb. 6, 1968, now abandoned. |

[54] ECCENTRIC, SEALLESS, ROTARY VALVE FOR FLOW CONTROL
11 Claims, 13 Drawing Figs.

| [52] | U.S. Cl. | 251/85, 251/298 |
|---|---|---|
| [51] | Int. Cl. | F16k 1/20 |
| [50] | Field of Search | 251/14, 56, 228, 298, 84, 85, 87 |

[56] References Cited
UNITED STATES PATENTS

| 515,410 | 2/1894 | Thomson | 251/87 |
|---|---|---|---|
| 755,284 | 3/1904 | Dixon | 251/298 |
| 932,494 | 8/1909 | Reeves | 251/85 |
| 1,156,326 | 10/1915 | Stiers | 251/298 |
| 2,196,503 | 4/1940 | McFee | 251/298 UX |
| 2,742,255 | 4/1956 | Sealey | 251/85 |

Primary Examiner—Henry T. Klinksiek
Attorney—Chittick, Pfund, Birch, Samuels & Gauthier ABSTRACT: A rotary-type control valve with gradual opening and closing characteristics and having a valve member rotatable eccentrically in the valve chamber relative to a port seat with an annular face engaged by the face of the valve member to provide a metal-to-metal seal for blocking fluid flow through the valve. Power and manual operating means are connected to the control valve which, as a unit, can be installed and removed from suitable connecting means in a conduit.

PATENTED NOV 30 1971

INVENTOR
HANS D. BAUMANN
BY Chittick, Pfund,
Birch, Samuels, & Gauthier
ATTORNEYS

HANS D. BAUMANN
INVENTOR.

ECCENTRIC, SEALLESS, ROTARY VALVE FOR FLOW CONTROL

This application is a continuation-in-part of my copending parent application Ser. No. 703,318 filed Feb. 6, 1968, now abandoned. This invention relates generally to control valves, and more particularly to rotary-type valve for controlling flows through fluid transport systems or conduits.

Rotary-type control valves and the general parameters of operation thereof are well known in the prior art. Basic operating requirements dictate that this type of valve be operable between a sealed or full-closed position and a full-flow or open position to control the flow of fluid and the rate of flow thereof. In present day fluid transport systems it is desirable that the increment of flow be relatively small when flow cutoff is approached. In other words, fast opening and closing characteristics have been found to be detrimental to dynamic stability in an automatic control loop. It is also desirable to provide immediate flow control from the terminal movement of the valve member to and from its cutoff position. This may be considered as elimination of overtravel which previously has been required for complete sealing against leakage.

Many varied forms of rotary type valve have been proposed and used in industry, each having been designed to meet the generally known parameters of operation and to obviate problems encountered which were specific to each such embodiment. It has been found that a simple axial increment of movement with normal rotation will provide a rotary type valve with rapid opening and closing characteristics which is well suitable for the general application of shutoff or ON/OFF valves.

In the case of an eccentrically mounted rotatable valve member difficulty has been experienced in fully seating against leakage. Towards overcoming this problem, various cam arrangements for final seating of eccentrically mounted rotatable valve members have been proposed as illustrated in U.S. Pat. Nos. 1,213,513, 1,504,288 and 1,595,038. Such cam arrangements generally are costly and difficult to manufacture, are subject to wear and malfunction, require a relatively high degree of maintenance and add substantially to the mass weight which is moved by valve operation. More important is the lost motion which is inherent in such a design making it unsuitable for automatic control applications.

Alternatively, rotatable eccentric spool-type valve with arcuate valve face configurations or cross sections in the port area have been proposed as shown in U.S. Pat. Nos. 3,170,669 and 3,254,872. In this type of construction the valve member represents a large and heavy mass to be moved which forms a relatively extensive friction interface interface with the port means for the valve housing.

Valves both of the cam type construction and the spool-type construction normally present manufacturing difficulties because of the close tolerances which must be maintained to obtain adequate sealing against leakage. Each of these arrangements is also subject to relatively severe wear conditions and leakage tends to occur after a limited period of operation. Therefore, to in crease manufacturing tolerances and thereby facilitate manufacture and to minimize leakage resulting from wear, deformable seals are used as is illustrated in various of the aforementioned patents. While tending to cure these foregoing problems, at least in part, deformable seals are subject to deterioration from friction, fluid erosion and aging, to attack by the fluids being transported and environmental conditions which are encountered by the system.

Various rotary valve members with spherical faces also have been proposed and embodied in such flow controls. It has been found that valves constructed according to commonly accepted practices and having this type of a face still require deformable seals to achieve completely sealed seating of the valve member as is shown in U.S. Pat. Nos. 3,090,593 and 3,191,906.

It should be appreciated that relatively high friction forces result in valves with deformable seals and extensive sealed interfaces being in contact with the rotating member throughout its full stroke and, like valves presenting heavy masses to be moved, require power operating systems with higher operating forces than would be normally required.

The present invention contemplates a rotary-type valve and operating means therefor adapted for connection and removal as a unit, comprising a housing having a tubular arm extending from one side therefrom, and defining a valve chamber with openings at its ends; an annular port seat fixedly disposed at the inner end of one of the openings and having a substantially rigid circular face the center of which is located on the axis of flow through the port seat; a unitary valve member disposed in the chamber having a central axis and a substantially rigid spherical face at one end thereof with its center located on the central axis; a shaft connected to the other end of the valve member and extending through the tubular arm; the shaft being journaled to rotate on an axis transverse to the axis of flow and rotating the spherical face eccentrically relative to the seat face of the port seat; the rotating shaft moving the spherical face into engagement with the seat face and exerting a force along the central axis causing the spherical face to pivot about its initial point of contact with the seat face and fully seal the port seat against leakage; the operating means being mounted on the tubular arm; and an operating arm fixedly mounted on the shaft and connected to the operating means.

Accordingly, an object of the present invention is to provide a rotary-type valve which is relatively simple and inexpensive to manufacture, and is of rugged construction not readily subject to malfunction.

Another object of the present invention is to provide a rotary-type valve with a minimum of moving parts from which all possible friction and lost motion has been eliminated.

And another object of the present invention is to provide a rotary-type valve with predictable and gradual flow characteristics which is achieved in the absence of V-type slots and other similar metering configurations heretofore provided in rotary valves.

And still another object of the present invention is to provide the foregoing valve with operating means connected thereto and which is adapted for connection and removal, with said operating means, as a unit. Further objects and advantages of the invention will become apparent from a study of the following specification taken in connection with the accompanying drawings wherein.

Figure 3:
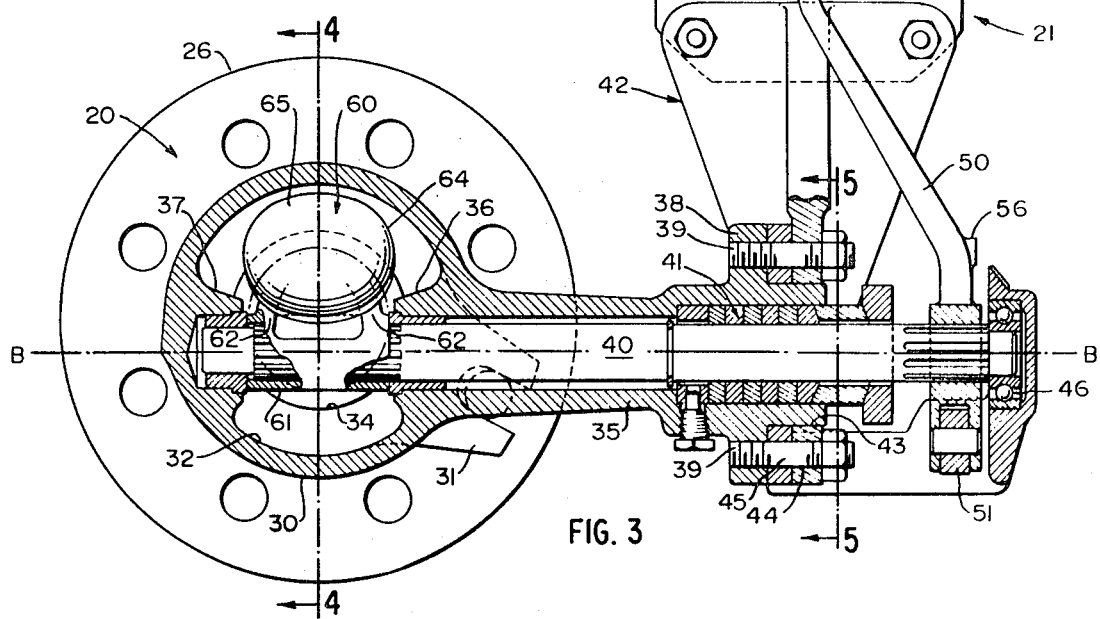

FIG. 3. is a vertical sectional view of the valve assembly embodying the present invention.

Figure 4:
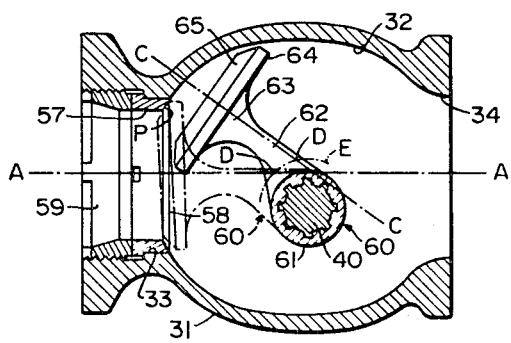
Figures 5, 6:
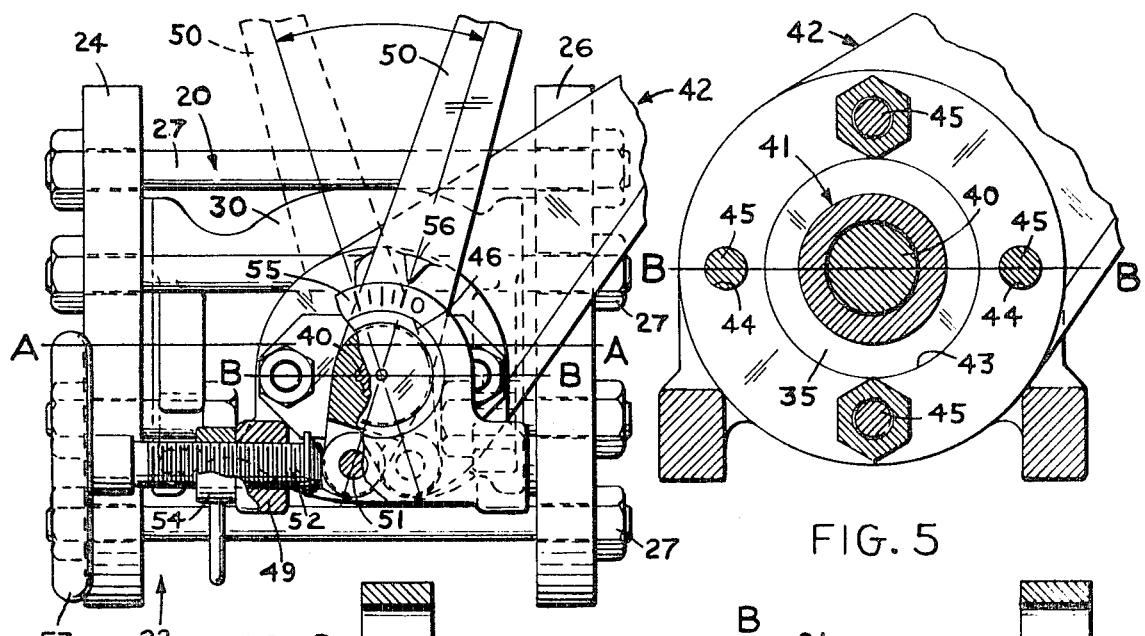

FIGS. 4 and 5 are sectional views taken on lines 4—4 and 5—5, respectively, of FIG. 3.

FIG. 6 is an enlarged side view of the novel valve assembly with part of the exterior thereof broken away to more clearly illustrate some of the working parts therein.

Figure 7:
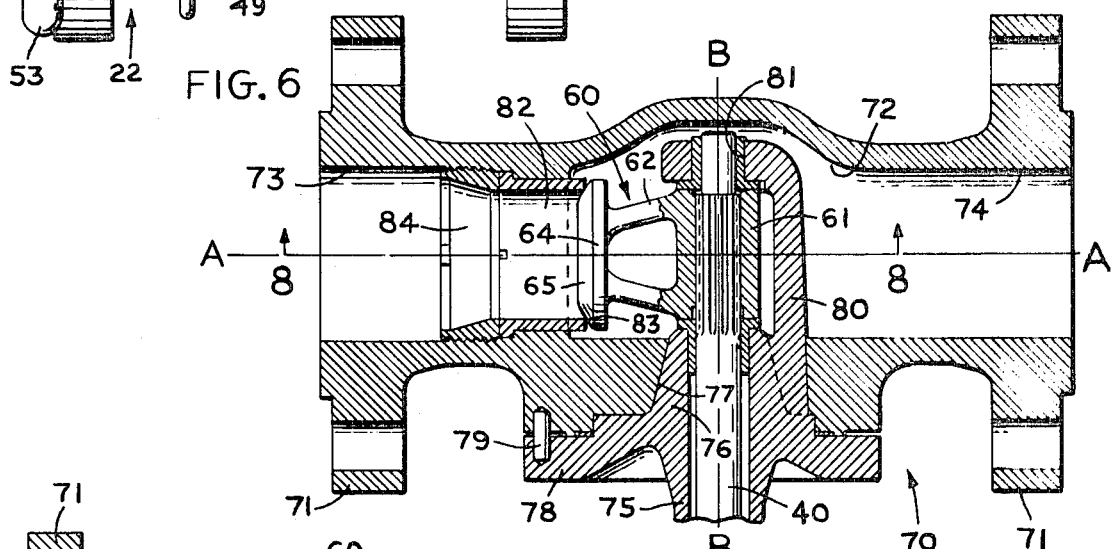

FIG. 7 is a horizontal sectional view of another form of valve assembly embodying the present invention.

Figure 8:
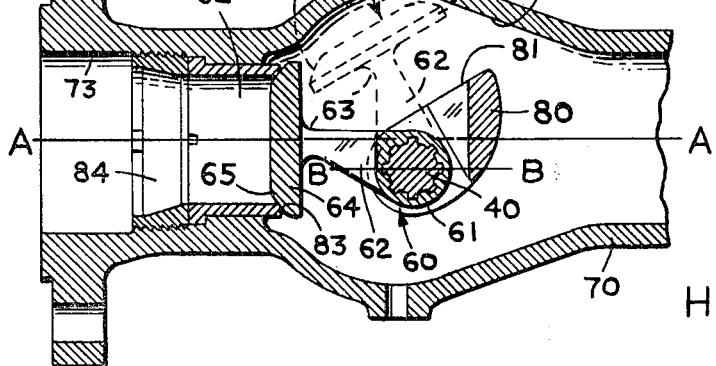

FIG. 8 is a sectional view taken on line 8—8 of FIG. 7.

Figure 9:
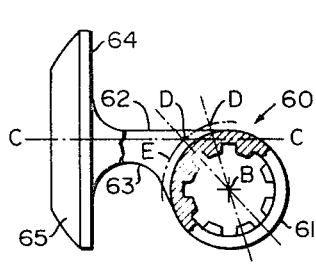
Figure 10:
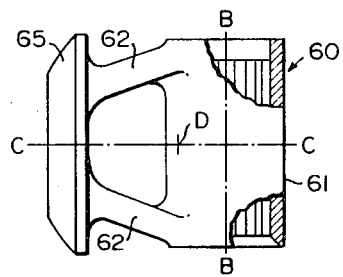

FIGS. 9 and 10 are top and side views, respectively, of a valve member made in accordance with the present invention, with portions thereof broken away in each view.

Figure 11:
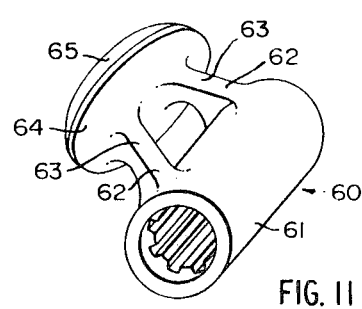

FIG. 11 is a perspective view of the valve member of FIGS. 9 and 10.

Figure 12:
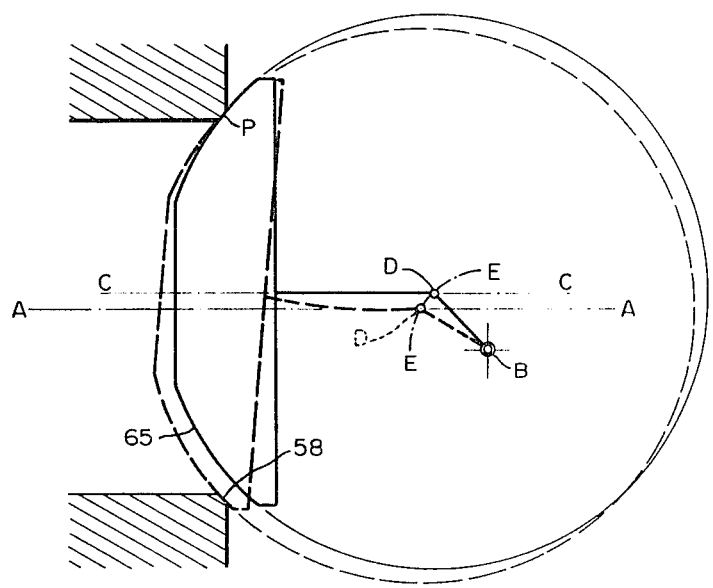

FIG. 12 is a larger scale diagram in which the pivot seating of the valve face is exaggerated for illustration.

Figure 1:
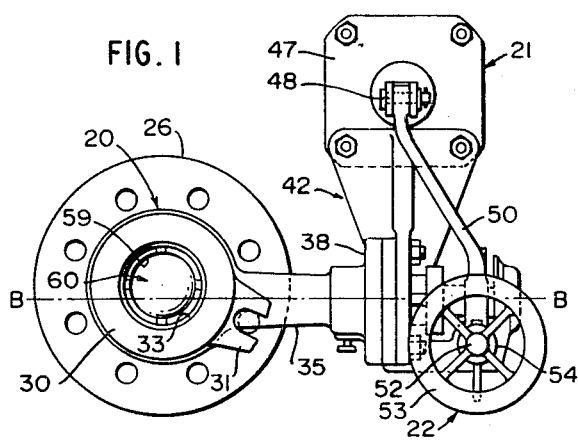
FIG. 1 is an end view of a valve assembly embodying the present invention.
Figure 2:
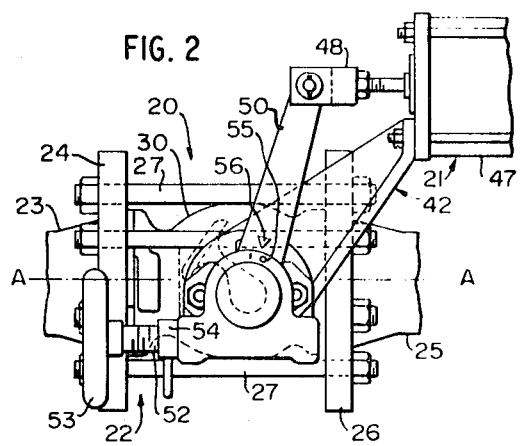
FIG. 2 is a side view of the valve assembly shown in FIG. 1.
Figure 13:
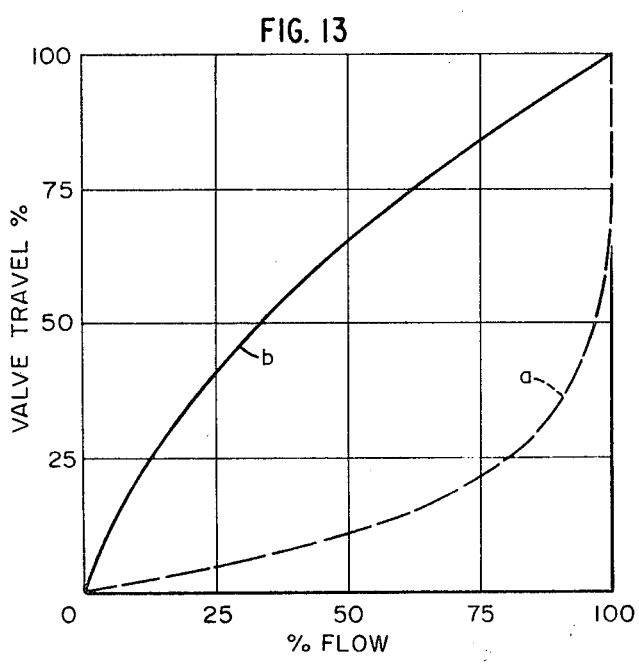

FIG. 13 is a flow chart for typical conventional flap valves and rotary valves made in accordance with the present invention, respectively. Referring now to the drawings and particularly to FIGS. 1 to 3, in accordance with the present invention a rotary valve or valve assembly 20 is provided with power operating means 21 and manual operating or override means 22 which can be connected as a single unit between two sections 23 and 25 of a fluid transport system of conduit. The conduit or pipe sections 23 and 25 have respective end flanges 24 and 26 which are connected together across the valve 20 in the usual manner with a plurality of tie rods 27 which are bolted at their ends. Usual seal means (not shown) are provided between the ends of the valve 20 and the flanges ends of pipe sections 23 and 25. The valve housing 30 of valve assembly 20 preferably has a slotted portion or bifurcation 31 for engaging one of the tie rods 27 to prevent rotation of the valve assembly 20 relative to the conduit portions 23 and 25.

The housing 30 of valve assembly 20 defines a valve chamber 32 therein and has openings or ports 33 and 34 at its respective ends which provide the requisite flow connections between the defined chamber and the conduit portions 23 and 25, respectively. A cantilevered tabular arm 35 extends outwardly from one side of the valve housing 30 on an axis B—B which is disposed laterally across or transverse to a longitudinal or flow axis A—A through the valve housing. The arm 35 also extends into chamber 32 providing a hollow or annular boss 36 which is axially aligned with an annular boss or socket 37 extending inwardly from the opposite side of the valve chamber. An enlarged or radially extending annular flange 38 with a series of spaced openings 39 is provided adjacent the free end of the arm 35 for mounting the operating means 21 and 22, as will be further described.

A shaft 40 is journaled in bushings in bosses 36 and 37 for rotation on the transverse axis B—B and extends outwardly of the flanged end of the arm 35 which houses suitable annular seal or packing means 41 to prevent leakage from chamber 32 along the shaft. A bracket 42 is provided at one end with an opening 43 which seats on the end of arm 35, and a series of spaced openings 44 corresponding to openings 39 for connecting the bracket to the flange 38 by bolts or studs 45, as is best shown in FIGS. 3 and 5. A bearing socket arrangement 46 is provided in the bracket 42 to rotatably support the end of shaft 40 opposite from the shaft end supported in the boss or socket 37.

The other end of bracket 42 is suitably connected to the power operating means 21 which, in this instance, is a cylinder 47 of an axial-type actuator or motor having a piston 48 which is pivotally connected to one end of a valve operating arm or lever 50 splined, as shown, or otherwise suitably connected to the shaft 40. The power operating means or axial motor 21 may be any capable of rotating the operating arm 50 between the full line and dotted line positions as shown in FIG. 6. The bracket 42 also is provided with a threaded or nut portion 49 disposed adjacent the bearing socket arrangement 46 (see FIG. 6) for the manual operating or override means 22.

The manual operating or override means 22 is a threaded shaft or screw 52 with a knob 53 at one end. The threaded shaft 52 is rotated and moved axially in the nut portion 49 against a pressure pad 51 at the end of arm 50 opposite from its end connected to piston 48. As shown in FIG. 6, the threaded shaft 52 when rotated moves axially against the pressure pad 51 urging the arm 50 to rotate about axis B—B from its solid line position toward its dotted line position. When the threaded shaft 52 is oppositely rotated, it moves axially away from the pad 51 freeing the arm 50 to rotate toward its solid line position under the control of the power operating or motor means 21. A jam nut 54 is provided on threaded shaft 52 for locking against movement in a preset position. An indicia 46 and a pointer 46 are provided on bracket 42 and arm 50, respectively, for providing a visible indication of the position of a valve member 60 of valve assembly 20 and is of particular utility when positioning the threaded shaft 52 for use as a limit stop.

Referring specifically to FIG. 4, valving or flow control, in this instance, is accomplished at the end opening or port 33 which is step bored and tapped. An annular seal or port seat 57 with an external annular shoulder is positioned and retained in the stepped bore by a ring nut 59. The inner annular edge of the port seat 57 preferably is suitably machined to provide a circular seat face 58 the center of which is located on the longitudinal or flow axis A—A and, in this instance, is substantially coincident or flush with the wall surface of the valve chamber 32.

Also referring to FIGS. 3 and 9 to 11, valve member 60 is of unitary construction having at one end a tubular mounting portion 61 splined or otherwise suitably connected to the shaft 40. A pair of converging arms 62 extend from the ends of the mounting portion 61 to a circular head 64 provided with a substantially rigid spherical face 65 at the other end of valve member 60. The arms 62, comprising means intermediate and supporting and spacing head 64 from the mounting portion or hub 61, additionally are tapered or otherwise suitably formed to provide reduced portions 63 adjacent the head portion 64 which are capable of being flexed in the plane of valve shifting and, accordingly, provide a limited or minimal amount of angular displacement or cocking of the head to insure complete seating of the spherical face 65 with seat face 58 of the port seat 57. The central portion of the spherical face 65 preferably is removed, as shown, to reduce the mass weight of the valve member 60 to be moved during the operation of the valve assembly 20. The end opening or port 34 is of a larger diameter than the head portion 64 or the axial length of the mounting portion 61. Therefore, valve housing 30 may be of unitary construction, and withdrawing the shaft 40 from the valve chamber 32 through the tubular arm 35 frees the valve member 60 for removal through the port 34.

For proper understanding of the operation of the novel valve assembly, discussion of the geometry of the related internal parts thereof is required. As was previously stated, axis A—A is the longitudinal or flow axis of the valve chamber 32 and the port seat 57. The center of the circular face 58, providing the inner end of the controlled port, is located on the axis A—A. The valve member 60 has a central axis C—C through the head portion 64 which is noncoincident with the axis A—A when the spherical face 65 initially engages seat face 58, as shown by the dotted line position of the valve member 60 in FIG. 4, and by the solid line position of the valve member 60 in FIG. 12 Therefore, the center D of the spherical face 65, which is located on the central axis C—C, is advanced to be located also on, i.e. to be coincident with on the flow axis A—A when the valve member 60 is manipulated to fully close the port seat against flow.

The transverse axis B—B of rotation of shaft 40 is located well within the longitudinal flow lines of, or which pass through, seat 57, and is also relatively close to but predeterminately offset from the port seat axis A—A. Valve member 60 is constructed and arranged to have the center D and central axis C—C of its face 65 offset from its rotational axis B—B, B and further to locate said face axis C—C and center D on the other side of the seat axis A—A from said rotational axis B—B, upon the initial engagement of face 65 with seat 58, as shown solid line in FIG. 12.

The valve member geometry further is to locate the valve head center D appreciably closer than the axis B—B to the valve seat 58, so as to include substantially more than ninety degrees (90°) in the angle C-D-B, again as shown in FIG. 12. Therefore, the center D of valve head face 65 moves along on or courses a path E—E in its rotation by shaft 40, said path E—E being eccentric to, and more particularly having an approaching or axial component of movement relative to, the port seat, in the closing manipulation of the valve member as now to be described.

As shown in FIGS. 4 and 12, the described offset and eccentric rotation of the valve engages the faces 58 and 65 at an initial point of engagement or contact P in the plane of the valve shifting and that is disposed or located at the front of the head portion 64 in the direction of closing movement thereof. Thereafter the axial component of the eccentric rotational force is exerted along the central axis C—C by a fulcrum or geometric arm B-D. The axial force exerted along the axis C—C urges the head portion 64 to pivot on the initial point of contact P until complete seating is had of the spherical face 65 on the seat face 58, upon the advancing of the valve member 60 from solid line to the dash line position of FIG. 12. In this, it will be obvious, the center D of valve face 65, in advancing along arc E—E eccentric to valve U.S. Pats. 58 to its ultimate point of coincidence with axis A—A, acts togglelike, or with a snap-action, multiplying the relatively small torque thereon by the shaft 40 rotation to a much larger axial force on, and sufficient to flex, the intermediate valve portion 63. The force multiplication, essential to the mentioned valve flexing, to the precise positioning of the valve for controlling flow, and to the firm closing of the valve for metal-to-metal sealing off flows, results, it will be obvious, from the mentioned inclining of the fulcrum arm B–D towards, or at substantially more than 90° from, valve member axis C—C.

Face 65 is thrust forwardly, by the mentioned flexing of intermediate portion 63, and accompanying pivoting of head portion 64, the requisite amount to accommodate the mentioned axial increment of movement of valve member center D, in its stated advance along arc E—E from the initial seat contacting to its final valve closing position. Again, the pivotal or seating movement is available to the head portion 64 by the limited flexure at the reduced portions 63 of the arm portions 62, which portions 63 are bent as shown exaggerated in dash line, FIG. 12, in the position in which the centers A, D of the hard or rigid faces 58 and 65 have become coincident, and full circumferential engagement or metal-to-metal seal of said faces 58, 65 has been achieved.

In said reduced portions 63 of its arms 62, then, the intermediate valve portion will have a section modulus whose elastic limit exceeds the stressing by the aforementioned pivoting of the head portion 64, such that repeated seating and unseating of the valve will not cause a permanent deformation of the arms 62. As will be appreciated by those skilled in the art, the extent of elastic deformation, as essentially determined by the modulus of elasticity of the material used, which may be stainless steel, is to be at least equal to, or to exceed, mechanical tolerances.

Similar reactions, in reverse, are realized when valve opening commences. At that time, forces derived from the flexure of arms 62 urge head portion 64 to pivot on the contact point P causing the front portion of the face 65, in the direction of opening movement, to break away from the face 58 and initially open the port seat 57 as soon as valve opening operation commences. The effective metal-to-metal seal achieved by the faces 58 and 65 of the port seat 57 and the valve member 60, respectively, in the manner described obviates the necessity of a deformable seal member or an extensive friction interface. From the foregoing description it should be fully understood that there is no overtravel of the valve member or operating means therefor, and flow control terminates and commences immediately with termination and commencement, respectively, of valve operation.

The flow rate of a typical conventional flap-type valve such as shown in the aforementioned U.S. Pat. No. 1,504,288, and the rate of change thereof are illustrated by the curve a of FIG. 13. The illustrative curve is applicable whether the valve is opening or closing and only the opening mode, therefore, will require discussion. It will be seen that an amount of valve opening operation occurs before flow commences. This is necessitated to sufficiently change the cam position to achieve lift-off of the flapper. Once flow commences the rate of change is quite rapid, as is illustrated by the curve, and no usable change of flow is realized after approximately 25 percent of the valve travel.

A corresponding curve b is provided by FIG. 13 for a corresponding typical rotary-type valve made in accordance with the present invention. It should be readily seen that flow commences or terminates immediately with initial or terminal valve operation, and that the rate of change at lower or initial travel positions is substantially lower than when the valve member has moved some degree away from the controlled port. Also, it should be noted that effective flow control is maintained through the complete amount of valve travel.

A modified valve construction, in accordance with the present invention is shown in FIGS. 7 and 8. In this instance, a modified valve housing 70 is provided with end flanges 71 each for independent connection to a different conduit flange 24 or 26. The valve housing 70 defines a valve chamber 72 with end openings or ports 73 and 74 corresponding to the chamber 32 and ports 33 and 34, respectively of valve housing 30. In this modified construction, a tubular arm 75 has a tapered boss portion 76 which extends through a corresponding opening 77 in the valve housing 70 and into the chamber 72 providing an annular boss therein corresponding to the annular boss 36.

The arm 75 is provided with a flange 78 adjacent to the boss portion 76 which is connected to the housing 70 by drive pins 79 or in any other suitable manner well known in the art. There is provided suitable means for sealing the connection between the housing 70 and the arm 75 to prevent leakage. An L-shaped support portion or bracket 80 extends from the boss portion 76 toward the opposite side of the chamber 72 and has an opening 81 in the leg portion thereof providing a socket in axial spaced alignment with the boss 76 and which corresponds to socket 37. In a manner similar to that of valve assembly 20, a shaft 40 is journaled in bushings for rotation in the boss 76 and the socket 81 on the transverse axis B–B. A valve member 60 again is suitably connected to shaft 40 as shown.

Port 73, like port 33, is step bored and tapped to receive an annular or port seat 82 with an external annular shoulder and which is retained therein by a ring nut 84 corresponding to port seat 57 and ring nut 59, respectively. The inner annular edge of port seat 82 is suitably machined to provide a face 83 corresponding to the seat face 58. The port seat 82 again provides the inner end of the valve port, but the seat face 83 is disposed inwardly of the wall surface of the chamber 72 and again is positioned to be engaged in the same manner by the spherical face 65 of the eccentrically rotatable valve member to provide a rigid or hard face or metal-to-metal seal.

It will be understood that the invention is not to be limited to the specific construction or arrangement of parts shown but that they may be widely modified within the invention defined by the claims.

What is claimed is:

1. In a rotary-type control valve, the combination of
   a housing defining a valve chamber having an inlet port and an outlet port for fluid flow therethrough to be controlled;
   an internal valve seat formed at one of said ports,
   said valve seat having a longitudinal flow axis A—A,
   said seat flow axis A—A extending centrally of the longitudinal lines of flow through said valve seat;
   valve member mounting and rotating means in said chamber intermediate said ports, said valve member mounting and rotating means arranged on a transverse axis B—B in a plane normal to said valve seat flow axis A—A,
   said transverse valve member mounting and rotating means having its transverse axis B—B within said longitudinal lines of flow through, and offset from said centrally longitudinally extending axis A—A of, said valve seat; and
   a hub rigidly non rotatably received on said valve member mounting and rotating means,
   a rigid head having a face formed for fluid-sealing engagement with said internal valve seat, and
   intermediate means supporting and spacing said head from said hub;
   said hub, intermediate means and head of said valve member being generally of rigid, unitary, hard metal construction,
   said intermediate means formed also with a predetermined elastic modulus in the direction of valve movement permitting its repeated slight flexing in the port opening-closing manipulation of the valve member,
   said valve member having an axis C—C centrally through said head, through the center D of said head face, and offset from said transverse rotation axis B—B
   said valve member constructed and arranged also for initial, point engagement of said valve head to said valve seat with said member axis C—C on the opposite side of said seat flow axis A—A from said rotation axis B—B, said valve member having a fulcrum arm B–D defined between said rotation axis B—B and said valve head center D said fulcrum arm B–D inclined towards said seat at a substantially greater than 90 degree angle to said seat flow axis A —A, whereby, in the continued actuation of said valve rotating means to fully close said valve, said fulcrum arm B–D is advanced to bring said valve head center D into coincidence with said seat axis A—A, and said intermediate means is thereby subjected to a large axial component of force sufficient to flex said intermediate means and pivot said head on said point until said valve head face is brought into full circumferential engagement against said seat.

2. A rotary-type control valve according to claim 1, wherein said valve member comprises:
   a circular head portion having a spherical face provided thereon:
   a mounting portion at the end remote from said head and connected to said mounting and rotating means; and
   arm means disposed between and joining said head and mounting portions together, and being formed adjacent said head portion to adapt said flexing intermediate means for limited angular displacement of said spherical face.

3. A rotary-type control valve according to claim 2, wherein said arms of the valve member forming said flexing intermediate means are proportional to the size of the circular head to permit the desired limited angular displacement of said spherical face during opening and closing movement of the valve member.

4. A rotary-type control valve according to claim 2, wherein said supporting and rotating means includes:
   a tubular means on said valve member;
   a socket disposed in said chamber in alignment with said tubular means; and
   a shaft extending through said tubular means into said chamber and outwardly thereof for engagement with said socket means; and
   said tubular means connected to and movable with said shaft so that the axis of the tubular means and the shaft are displaced from the central axis of the valve member and the axis of fluid flow through the housing; and
   driving means connected to said shaft for actuating said shaft to rotate the valve member for operation thereof.

5. A rotary-type control valve a according to claim 4, wherein said supporting and rotating means further includes:
   an operating arm connected to said shaft at an end thereof exterior to said housing and extending radially relative to the axial line of fluid flow in the housing;
   said driving means for rotating said shaft being connected to said operating arm.

6. A rotary-type control valve according to claim 5, wherein said supporting and rotating means further includes:
   a bracket operatively associated with said housing and having means therein to receive said tubular means of the valve member; and
   said socket means formed at one end of said bracket for rotatably supporting the end of said shaft remote from the operating arm.

7. A rotary-type control valve according to claim 1, wherein said intermediate means comprises a plurality of arms arranged longitudinally of said rotating means and connecting between said hub and head portions of said valve member, said arms having a section reduced in the direction of said valve movement sufficiently for the flexing required by said pivoting of said head of said valve.

8. A rotary-type control valve according to claim 1, when said hub portion is slidable on said rotating means, whereby said valve head face is self-adjusting to said valve seat in the transverse direction of said rotating means.

9. A rotary-type control valve according to claim 1, wherein said valve seat and head face are circular.

10. A rotary-type control valve according to claim 1, wherein said valve seat is circular and said head face is spherical.

11. A rotary type control valve according to claim 1, when said head face is flattened annular.

* * * * *

UNITED STATES PATENT OFFICE
CERTIFICATE OF CORRECTION

Patent No. 3,623,696　　　　　　　　　Dated November 30, 1971

Inventor(s) Hans D. Baumann

It is certified that error appears in the above-identified patent and that said Letters Patent are hereby corrected as shown below:

On the Title page, the Assignee's address should read --Mass.-- instead of "Calif.".

Column 1, line 50, cancel "interface", second occurrence.

Column 3, line 61, "46", first occurrence, should read --55--; "46", second occurrence, should read --56--.

Column 4, line 74, "U.S. Pats." should be deleted and --seat-- should be inserted therefor.

Column 6, after line 55, and before line 56, insert, as a separate line and paragraph, the following:

--a valve member comprising--.

Column 8, line 39, "flattened" should read --flatted--.

Signed and sealed this 15th day of August 1972.

(SEAL)
Attest:

EDWARD M. FLETCHER, JR.　　　　　ROBERT GOTTSCHALK
Attesting Officer　　　　　　　　Commissioner of Patents